UNITED STATES PATENT OFFICE.

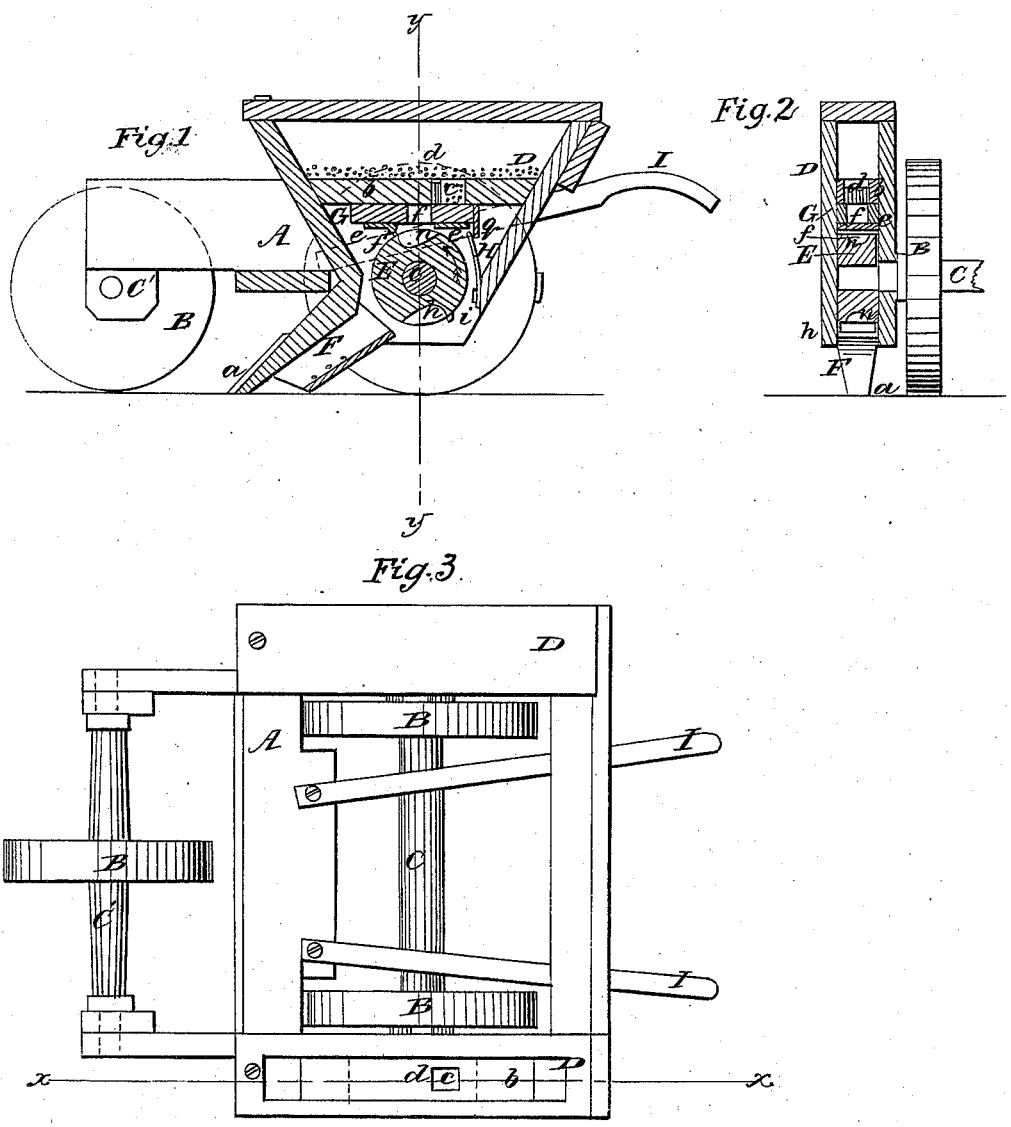

W. A. MAHAFFY, OF CARIMONA, MINNESOTA, ASSIGNOR TO JOHN GRECK, OF EVANSVILLE, INDIANA.

IMPROVEMENT IN SEED-PLANTERS.

Specification forming part of Letters Patent No. 21,397, dated August 31, 1858.

*To all whom it may concern:*

Be it known that I, W. A. MAHAFFY, of Carimona, in the county of Fillmore and State of Minnesota, have invented a new and Improved Seeding-Machine; and I do hereby declare that the following is a full, clear, and exact description of the same, reference being had to the annexed drawings, making a part of this specification, in which—

Figure 1 is a vertical section of my invention, taken through one of the seed-boxes, as indicated by the line $x\ x$, Fig. 3. Fig. 2 is a transverse vertical section of the same, taken in the line $y\ y$, Fig. 1. Fig. 3 is a plan or top view of the same.

Similar letters of reference indicate corresponding parts in the several figures.

This invention relates to an improved seed-distributing device, which will be hereinafter fully shown and described, whereby the seed is discharged in measured quantities from the seed-box and conveyed from thence in said quantities to the conveying-tubes, at the bottom of which the furrow-teeth are formed, the seed being deposited in the furrows in quantities precisely the same as they are discharged from the seed-box.

The object of the invention is to prevent the scattering of the seed as it is planted, and to insure an even and perfect distribution of the same.

To enable those skilled in the art to fully understand and construct my invention, I will proceed to describe it.

A represents a horizontal frame, which is mounted on wheels B B B, said wheels being attached permanently to their axles C C', which turn with the wheels. At each side of the frame A a seed-box, D, is attached, and on each end of the axle C a wheel or cylinder, E, is placed, a wheel being in the lower part of each seed-box. To the lower end of each seed-box D a tube, F, is attached. These tubes are inclined, their lower ends projecting forward, a furrow-tooth, $a$, being formed on the lower end of each tooth F. In each seed-box D a horizontal partition, $b$, is formed, and an aperture, $c$, is made in each partition, said apertures being each provided with a cut-off brush, $d$. Directly below each partition $b$ a slide, G, is placed. These slides work in a loop or guide, $e$, and are each provided with an opening, $f$, the size of which corresponds with the openings in partitions $b$. To the under side of each slide G a pin, $f'$, is attached, and springs H, which are secured in the lower parts of the seed-boxes (one in each) bear against ledges or pendants $g$ at the outer ends of the slides. These springs have a tendency to keep the slides thrown back.

In the periphery of each wheel or cylinder E two seed-cells, $h\ h$, are made at opposite points, and in the periphery of each wheel or cylinder, and at the edge of each cell $h$, a pin, $i$, is driven.

To the frame A two handles, I I, are attached.

The operation is as follows: As the machine is drawn along the wheels or cylinders E E actuate the slides G in one direction—that is, the pins $i$ throw the slides forward and the springs H throw the slides back. As the slides G are thrown forward out of line with the openings $c$ and from underneath the loops $e$ by the pins $i$ the seed will fall into the cell $h$, adjoining the pin which actuated the slide, and the grain, as the wheels E rotate, is carried down into the tube F, through which it falls into the furrow made by tubes F, and by them is conveyed to the furrows made by the teeth $a$ of tubes F. The wheels or cylinders E, it will be seen, serve as cams to actuate the slide, and also serve as conveyers to convey the seed to the tubes F F and gently deposit it therein and prevent the scattering of the same.

I am aware that reciprocating perforated seed-slides have been previously used, and I am also aware that wheels or cylinders provided with seed-cells have also been used for distributing seed; but I am not aware that reciprocating slides have been used in connection with rotating cylinders provided with seed-cells and pins to serve as cams or tappets to actuate the slides and also as conveyers to carry the seed to the conveying-tubes. I do not claim, therefore, separately and broadly, the seed-slides, nor the wheels provided with seed-cells; but I do claim as new and desire to secure by Letters Patent—

The seed-slides $b$, in combination with the wheels or cylinders E, arranged for joint action substantially as and for the purpose set forth.

W. A. MAHAFFY.

Witnesses:
ELVIN PICKETT,
GEORGE W. TATE.